March 4, 1969  J. G. BELTER  3,430,611
CYLINDER HEAD GASKET ASSEMBLY WITH FLUID-COOLED
COMBUSTION SEALING RINGS
Filed June 13, 1967  Sheet 1 of 2
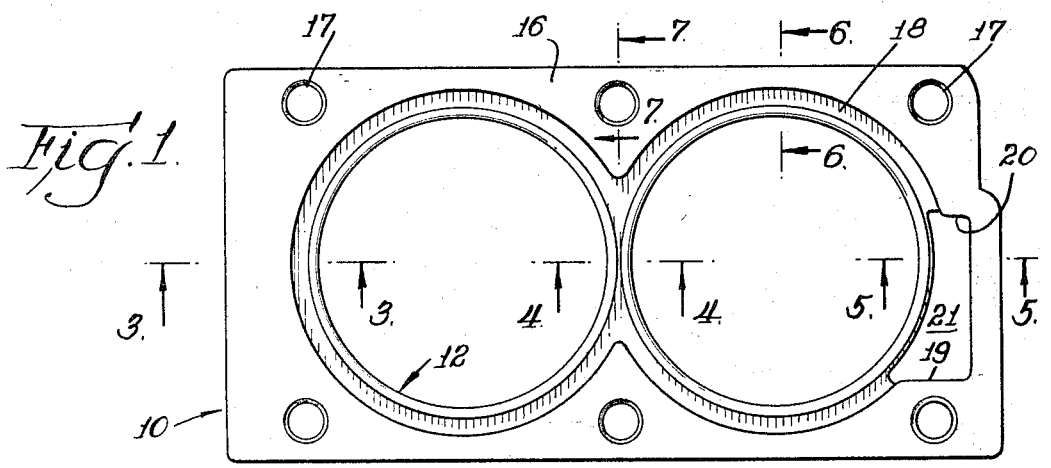
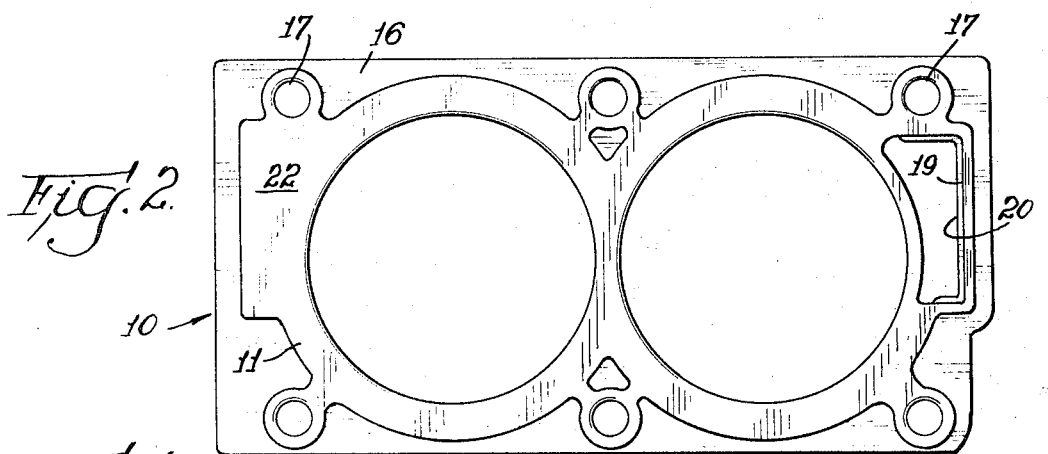
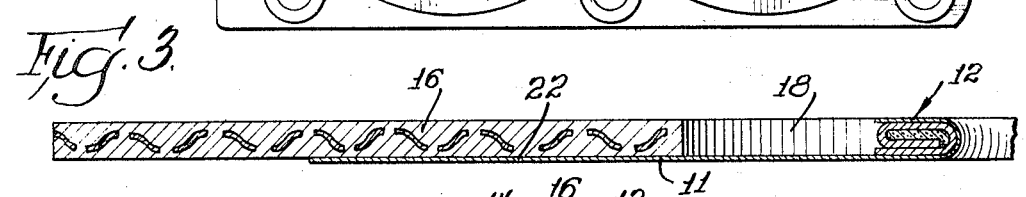
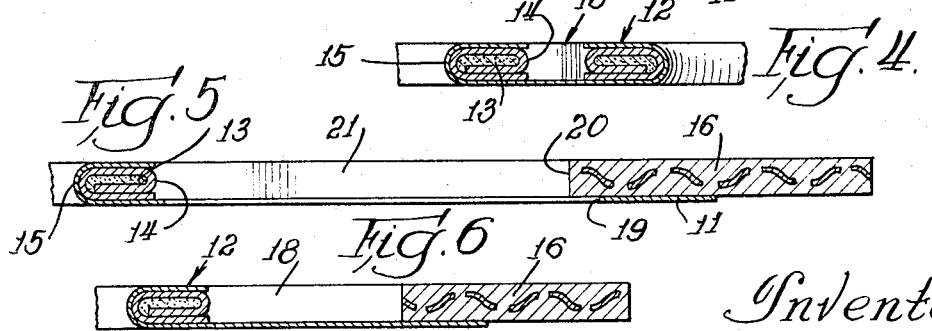
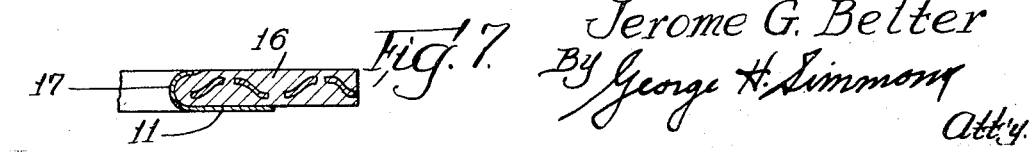
Inventor
Jerome G. Belter
By George H. Simmons
Att'y

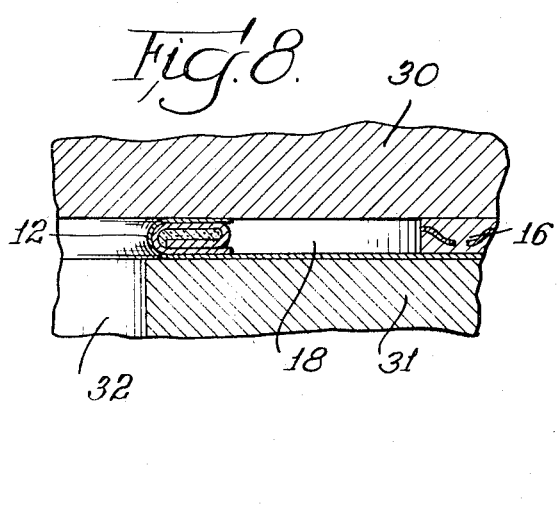
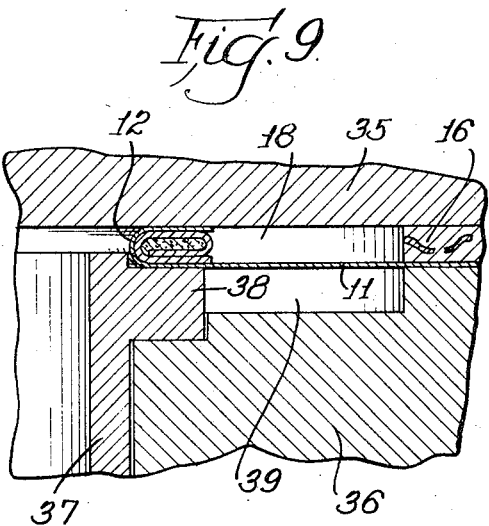
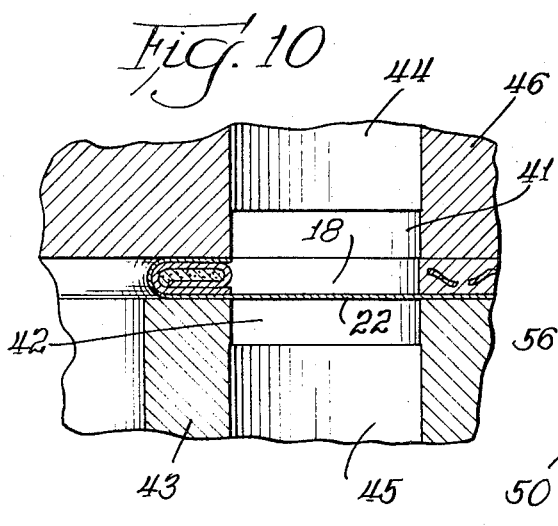
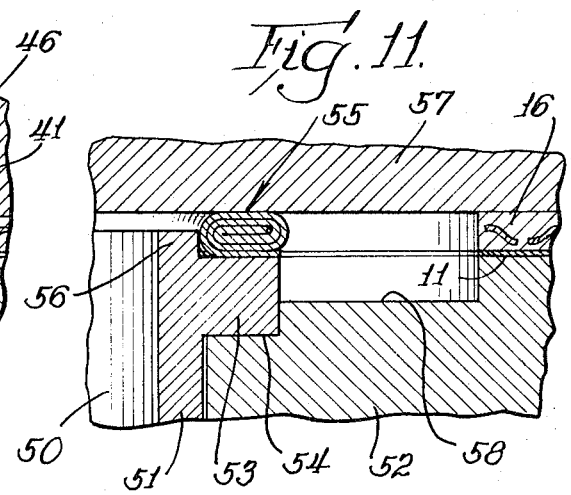

United States Patent Office 3,430,611
Patented Mar. 4, 1969

3,430,611
CYLINDER HEAD GASKET ASSEMBLY WITH FLUID-COOLED COMBUSTION SEALING RINGS
Jerome G. Belter, Mount Prospect, Ill., assignor, by mesne assignments, to Dana Corporation, Toledo, Ohio, a corporation of Virginia
Filed June 13, 1967, Ser. No. 645,813
U.S. Cl. 123—41.82                              6 Claims
Int. Cl. F16k 41/00; F16j 15/00; F02 1/36

ABSTRACT OF THE DISCLOSURE

A cylinder head gasket assembly including combustion sealing rings for sealing the gases of combustion in an internal combustion engine and containing a channel through which coolant flows to remove heat from the combustion sealing rings during operation of the engine.

---

It is a main object of the invention to provide a cylinder head gasket assembly including combustion sealing rings and arranged to conduct coolant into engagement with said rings to remove heat from the same during operation of an internal combustion engine in which the gasket assembly is installed.

Another object of the invention is to provide a cylinder head gasket containing a metal member to which combustion sealing rings and a gasketing material are fixed with the material spaced radially outwardly from the rings to form a channel through which a coolant is forced.

Another object of the invention is to provide cylinder head gasket assembly containing port means and a channel through which coolant, entering the gasket through the port means, flows and engages combustion sealing rings to remove heat therefrom during operation of an internal combustion engine.

Further objects of the invention not specifically mentioned here will be apparent from the detailed description and claims which follow, reference being had to the accompanying drawings in which a preferred embodiment of the invention is shown by way of example and in which:

FIGURE 1 is a topside plan view of a gasket assembly embodying the teachings of the invention;

FIGURE 2 is a bottomside view of the gasket shown in FIGURE 1;

FIGURE 3 is a cross sectional view taken along the line 3—3 of FIGURE 1 looking in the direction of the arrows and drawn to an enlarged scale;

FIGURE 4 is a view similar to FIGURE 3 taken along the line 4—4 of FIGURE 1 looking in the direction of the arrows;

FIGURE 5 is a view similar to FIGURE 3 taken along the line 5—5 of FIGURE 1 looking in the direction of the arrows;

FIGURE 6 is a view similar to FIGURE 3 taken along the line 6—6 of FIGURE 1 looking in the direction of the arrows;

FIGURE 7 is a view similar to FIGURE 3 taken along the line 7—7 of FIGURE 1;

FIGURE 8 is a fragmentary cross sectional view similar to FIGURE 6 and showing a gasket assembly clamped between the head and block of an engine;

FIGURE 9 is a fragmentary cross sectional view similar to FIGURE 8 and showing a gasket assembly clamped between the head and block of a sleeved internal combustion engine;

FIGURE 10 is a fragmentary cross section showing the gasket assembly of FIGURE 1 installed between the head and block of an outboard marine-type engine; and FIGURE 11 is a fragmentary cross sectional view showing a modified form of gasket assembly installed in a diesel-type engine.

During operation of high compression internal combustion engines, there is built up in the combustion chambers of the engine high pressures and high temperatures. These combustion chambers are usually sealed by a metal sealing flange on the block engaged by the cylinder head or by a combustion sealing ring, composed wholly or in part of metal, engaged by the head and the block, sleeve, or wall defining the chamber. These sealing rings are compressed sufficiently to seal the high pressures in the chamber by clamping pressure applied as the cylinder head bolts or studs are torqued down to the manufacturer's specification.

The combination of high pressure and high temperatures developed in the combustion chamber tend to deteriorate the sealing stress of the combustion seal, thus allowing combustion gas pressure to leak, resulting in deterioration of the head gasket, and subsequent gasket failure.

The present invention provides for minimizing, if not completely eliminating, deterioration of the combustion sealing rings with the result that the engine can be operated for a substantially longer period of time before impairment of the rings results.

The teachings and objects of the invention are accomplished in a preferred embodiment by providing a cylinder head gasket assembly that has a metal member to which the combustion sealing rings are securely fixed. Also securely fixed to the metal member is a compressible gasketing material and when interposed between the block and head of an engine and the head bolts or studs are torqued down to specified amounts, the gasket is compressed sufficiently to seal the products of combustion in the combustion chamber and to seal other fluids encountered.

To accomplish this result, in the preferred embodiment, the compressible gasketing material attached to the metal member of the gasket, terminates radially outwardly from the combustion sealing rings and when clamped between the head and block of the engine forms a channel through which coolant is forced during operation of the engine. This coolant being in direct contact with the combustion sealing rings carries away from the rings the heat absorbed by the rings from the high temperature gases in the combustion chamber. With the rings thus cooled, the gasket assembly will function properly for a substantially longer period of time.

The preferred embodiment of the invention thus described is advantageous in that the assembly produces a cylinder head gasket that is a complete unit. When the gasket is located upon the block of an engine by projecting the cylinder head studs through the bolt holes in the gasket, the combustion sealing rings will register properly with the combustion chambers to be sealed. In certain instances, for example when the assembly is to be used in an engine in which the combustion chamber is formed by a sleeve in the block, it may be advantageous to use a combustion sealing ring that is not fixed upon the gasket backing member. In such engines the combustion sealing ring is located by a projection on the sleeve that engages the radially inner edge of the ring. The gasket backing member is terminated flush with the channel defining edges of the gasketing material, and in certain instances the backing member can be omitted. Such modifications are contemplated within the teachings of the invention.

The invention will be best understood by reference to the accompanying drawings, particularly FIGURES 1 to 10 thereof, in which there is shown by way of example a preferred form of gasket assembly indicated generally at 10. As shown, this gasket consists of a metal member 11 which from FIGURE 2 will be seen to be a skeleton form or frame for the gasket. Fixed to openings in the member 11 are combustion sealing rings indicated generally at 12, there being one such ring for each combustion chamber of the block of the engine that the gasket is designed to seal.

As will be seen best in FIGURES 3 to 7 inclusive, each sealing ring 12 consists of an annulus 13 of compressible material preferably asbestos which is completely encased in a metal sheath 14. The ring thus formed is secured in the metal member 11 by a flange 15 which engages the inner edge of the combustion sealing ring and extends outwardly from this edge across the upper surface of the ring and terminates in alignment with the outer edge of the ring.

The particular type of combustion sealing ring is not of the essence of the invention and the type of ring shown is by way of example only. In certain instances it may be advantageous to use an all metal folded over ring, for example, a ring of the general type shown in the Oven Patent 1,846,402 issued Feb. 23, 1932.

Also secured to the metal member 11 is a sheet of compressible gasketing material 16 which is secured on the metal member by grommets 17 that are integral with the metal member 11 and extend upwardly through perforations in the facing material 16 and thence into engagement with the upper surface of this material to secure the same onto the metal member.

From FIGURES 1, 3, 5 and 6 it will be seen that the inner edge of the gasketing material 16 is spaced radially outwardly from the rings 12 forming a channel 18 through which coolant travels as will presently appear.

Since fluid in channel 18 is in direct contact with the edges of the material 16 as well as in contact with the ring 12, it is necessary that this material be capable of resisting absorption and deterioration derived from the coolant. Gasketing materials of the type shown in the Patent 2,992,151 issued to Paul F. Niessen, July 11, 1961, have been found to be satisfactory for this use. Briefly, these materials consist of a perforated core to each face of which a sheet of elastomeric bound asbestos fiber is bonded under such conditions as to insure adherence of the facing sheets to the core of the material. While this material has been found satisfactory and its use is preferred, the substitution of other comparable materials is contemplated within the teachings of the invention.

As will be seen best in FIGURES 2 and 5, the metal member 11 contains, adjacent one of its ends, a perforation 19 and the gasketing material 16 contains a perforation 20 that is registered with the perforation 19. These perforations form a port 21 through which coolant enters the channel 18, as will presently appear.

From FIGURE 2 it will be noted that the metallic member 11 has a projection 22 that extends outwardly from the ring into juxtaposition to the end of the gasket which is opposite the port 21. The purpose of this extension will appear hereinafter.

The size, shape and location of the port 21 and projection 22 will depend upon the design of the cylinder head and block of the engine in which the gasket assembly is to be used. The locations shown in FIGURES 1 and 2 are shown by way of example only.

In FIGURE 8 there is shown a gasket of the type shown in FIGURES 1 through 7 installed between the cylinder head 30 and block 31 of an engine in which the wall of the combustion chamber 32 is an integral part of the block. It will be noted that the head 30 engages the combustion sealing ring 12 and the gasketing material 16, and that it forms the upper wall of the channel 18. Coolant entering channel 18 through a port, not shown, that is registered with a duct in the block, engages the ring 12 and removes heat therefrom during operation of the engine. The thus heated coolant flows out of the channel through a duct in the head, not shown.

In FIGURE 9 there is shown the preferred form of gasket installed between the head 35 and the block 36 of an engine that is equipped with a sleeve 37 that defines the combustion chamber of the engine. The combustion sealing ring 12 of the gasket is supported upon the upper surface of a flange 38 by which the sleeve is supported in the block. The metal member 11 of the gasket spans a counterbore 39 in the block which communicates with the coolant cavity in the block through a duct, not shown. During operation of the engine coolant flows through the counterbore 39 and beneath the backing member 11 thence into channel 18 through a port such as 21, not shown. The coolant withdraws heat from the ring 12 and flows out of the channel into the cylinder head chamber in known manner.

In FIGURE 10 there is shown an outboard marine-type engine in which the cylinder head 40 contains a groove 41 that is aligned with a groove 42 in the block 43. Groove 41 communicates with the coolant cavity in the head through a duct 44 and groove 42 communicates with the coolant cavity in the block through a duct 45. When the gasket of the present invention is clamped between the head and block, projection 22 spans grooves 41 and 42. Coolant enters groove 42 through duct 45 and flows therethrough and through a port 21, not shown, into channel 18 which coincides with the groove in the head 40. Coolant in channel 18 withdraws heat from the combustion sealing ring 12 and the thus heated coolant flows through duct 44 into the coolant chamber in the head 40, not shown.

In FIGURE 11 there is shown a modified form of gasket assembly clamped between the cylinder head and block of a high compression engine such as a diesel. As shown, the combustion chamber 50 is formed by a sleeve 51 which is supported in the block 52 by a flange 53 registered in a counterbore 54 in the block. The combustion sealing ring 55 rests upon the upper surface of the flange 53 and is centered thereon by a projection 56 that engages the inner edge of the ring. The gasket body consisting of backing member 11 and gasketing material 16 terminates at its inner edge, radially outwardly from the ring 55 and flush with counterbore 56 that surrounds the sleeve 51. The cylinder head 57 engages the ring 55 and the gasketing material 16 and when the head is clamped in working position does not engage the projection 56.

Coolant flows from the coolant cavity in block 52 through a duct, not shown, into the chanel 58 that is bounded by the combustion sealing ring 55 and the outer edge of the flange 53, by the gasket material 16, the outer edge of the counterbore 56, by the head 57 and bottom of counterbore 56. The cross sectional area of the channel 58 is determined by the depth and width of counterbore 56. Coolant flowing through channel 58 removes heat from the ring 55 and flange 53 and the thus heated coolant passes out of the channel and into the coolant chamber in head 57 through a duct, not shown.

From the foregoing it will be apparent that the gasket assembly of the present invention adds a new innovation to the cooling of high compression internal combustion engines, namely, circulating the coolant in direct contact with the combustion sealing rings of the gasket assembly thereby to lengthen the useful life of those rings.

While I have shown and described a preferred embodiment of the invention, there are many modifications which can be made within the teachings of the invention to adapt the gasket assembly for use with engines other than those shown by way of example. Also it is contemplated that materials other than those specified will be used in fabricating the gasket assemblies of the present invention.

Having thus complied with the statutes and shown and described a preferred embodiment of my invention, what I consider new, and desire to have protected by Letters Patent is pointed out in the appended claims.

What is claimed is:

1. A gasketing assembly adapted to be clamped between the cylinder head to the block of an internal combustion engine to form a seal therebetween, said assembly comprising:
   (a) a metal gasket backing member;
   (b) a combustion sealing ring for each cylinder in the block, registered with and fixed to said backing member;
   (c) a compressible gasket material fixed on said metal member and spaced radially outwardly from said combustion sealing rings to define a channel through which coolant is forced from end to end of the assembly to remove heat from the rings during operation of the engine; and
   (d) port means in said assembly through which coolant from the block is admitted into said channel.

2. A gasketing assembly as specified in claim 1 in which the combustion sealing rings consist of a core of compressible material that is different from the gasketing material and a metallic sheath encasing said core.

3. A gasketing assembly as specified in claim 1 in which the backing member forms one wall of the channel and contains combustion chamber openings equipped with flanges that engage the inner and top surfaces of the combustion sealing rings to secure those rings in the assembly.

4. A gasketing assembly as specified in claim 1 in which the gasket material is fixed on the backing member by grommets surrounding bolt holes in the member and extending through holes in the material aligned therewith.

5. A gasketing assembly as specified in claim 1 in which the gasket material consists of a metal core to each face of which core a sheet of elastomeric bound asbestos is fixed by prongs struck out of the core and embedded in the sheets.

6. A gasketing assembly as specified in claim 1 in which the port means consists of a perforation in the backing member registered with a coolant chamber opening in the block and communicating with the channel and a perforation in the material registered with the backing member perforation.

References Cited

UNITED STATES PATENTS

| | | | |
|---|---|---|---|
| 1,782,087 | 11/1930 | Bailey | 277—235 |
| 1,846,402 | 2/1932 | Oven | 277—235 |
| 1,570,334 | 1/1926 | Chilton | 123—41.82 |
| 1,748,582 | 2/1930 | Oven | 277—235 |
| 1,932,539 | 10/1933 | Victor | 277—235 |
| Re. 19,874 | 2/1936 | Victor | 277—235 |
| 2,092,231 | 9/1937 | Victor | 277—235 |
| 2,992,151 | 7/1961 | Niessen | 277—235 |

FOREIGN PATENTS 406,000  2/1934  Great Britain.

WENDELL E. BURNS, *Primary Examiner.*

U.S. Cl. X.R.

123—193; 277—235